(12) United States Patent
Bennett

(10) Patent No.: US 11,829,515 B2
(45) Date of Patent: Nov. 28, 2023

(54) SYSTEMS, METHODS, AND DEVICES FOR PRIVACY-PROTECTING DATA LOGGING

(71) Applicant: JPMORGAN CHASE BANK, N.A., New York, NY (US)

(72) Inventor: Jeremy F. Bennett, San Carlos, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 146 days.

(21) Appl. No.: 16/838,828

(22) Filed: Apr. 2, 2020

(65) Prior Publication Data
US 2020/0380170 A1 Dec. 3, 2020

Related U.S. Application Data

(60) Provisional application No. 62/874,240, filed on Jul. 15, 2019, provisional application No. 62/856,491, filed on Jun. 3, 2019.

(51) Int. Cl.
*G06F 21/00* (2013.01)
*G06F 21/62* (2013.01)
(Continued)

(52) U.S. Cl.
CPC ........ *G06F 21/6263* (2013.01); *G06F 16/955* (2019.01); *G06F 21/602* (2013.01);
(Continued)

(58) Field of Classification Search
CPC .. G06F 21/6263; G06F 16/955; G06F 21/602; G06F 21/6254; G06F 40/279;
(Continued)

(56) References Cited

U.S. PATENT DOCUMENTS 6,360,254 B1 * 3/2002 Linden ................ G06F 21/31
709/219
9,060,031 B1 6/2015 Taylor et al.
(Continued)

FOREIGN PATENT DOCUMENTS

CA 2775427 10/2012
DE 102017116425 1/2018

OTHER PUBLICATIONS

Panopticlick, Panopticlick 3.0, Is your browser safe against tracking?, EFF: Electronic Frontier Foundation, Mar. 4, 2016.
(Continued)

*Primary Examiner* — Michael M Lee
(74) *Attorney, Agent, or Firm* — GREENBERG TRAURIG LLP

(57) ABSTRACT

Systems, methods, and devices for privacy-protecting data logging that can log user behavior (e.g., web browsing) without creating a user-specific list of browsed URLs are disclosed. In one embodiment, in an information processing apparatus comprising at least a token server, a privacy service, and a data store, a method for privacy logging may include: (1) providing, by the token server, a token to a privacy application executed on an electronic device and to a privacy service; (2) receiving, by the privacy service, browsing traffic from a browser or application executed by the electronic device; (3) associating, by the privacy service, the browsing traffic with the token; and (4) storing, by the data store, the associated browsing traffic with the token.

14 Claims, 2 Drawing Sheets

(51) Int. Cl.
| | |
|---|---|
| *G06N 20/00* | (2019.01) |
| *G06F 40/279* | (2020.01) |
| *H04W 12/02* | (2009.01) |
| *G06F 16/955* | (2019.01) |
| *G06F 21/60* | (2013.01) |
| *H04L 9/32* | (2006.01) |
| *H04L 9/40* | (2022.01) |
| *G01S 19/42* | (2010.01) |
| *H04L 67/02* | (2022.01) |
| *H04L 61/5007* | (2022.01) |

(52) U.S. Cl.
CPC ........ *G06F 21/6254* (2013.01); *G06F 40/279* (2020.01); *G06N 20/00* (2019.01); *H04L 9/3213* (2013.01); *H04L 63/1425* (2013.01); *H04L 63/20* (2013.01); *H04W 12/02* (2013.01); *G01S 19/42* (2013.01); *G06F 2221/2149* (2013.01); *H04L 61/5007* (2022.05); *H04L 67/02* (2013.01)

(58) Field of Classification Search
CPC .......... G06F 2221/2149; G06F 16/957; G06F 21/604; G06F 21/6245; H04L 9/3213; H04L 63/1425; H04L 63/20; H04L 61/2007; H04L 67/02; H04L 63/0407; H04L 67/22; H04L 67/2804; H04L 63/0428; H04W 12/02; G06N 20/00; G01S 19/42

See application file for complete search history.

(56) References Cited

U.S. PATENT DOCUMENTS

| | | | | |
|---|---|---|---|---|
| 9,210,090 | B1* | 12/2015 | Baldi | H04L 47/31 |
| 10,298,401 | B1* | 5/2019 | Goldberg | H04L 63/02 |
| 10,615,965 | B1* | 4/2020 | Goldberg | H04L 51/063 |
| 11,228,566 | B1* | 1/2022 | Kothari | H04L 63/0435 |
| 2001/0054155 | A1* | 12/2001 | Hagan | H04L 69/329 |
| | | | | 713/193 |
| 2008/0127335 | A1* | 5/2008 | Khan | H04L 63/1425 |
| | | | | 707/999.107 |
| 2008/0244076 | A1* | 10/2008 | Shah | H04L 67/306 |
| | | | | 709/227 |
| 2011/0202991 | A1* | 8/2011 | Paquin | H04L 9/3213 |
| | | | | 726/9 |
| 2012/0124372 | A1* | 5/2012 | Dilley | H04L 67/564 |
| | | | | 713/162 |
| 2012/0185947 | A1 | 7/2012 | Phillips et al. | |
| 2012/0240237 | A1 | 9/2012 | Kanevsky et al. | |
| 2012/0331567 | A1 | 12/2012 | Shelton | |
| 2013/0212465 | A1 | 8/2013 | Kovatch | |
| 2014/0129670 | A1 | 5/2014 | Oliver | |
| 2015/0180902 | A1 | 6/2015 | Biswas et al. | |
| 2016/0140353 | A1 | 5/2016 | Biswas et al. | |
| 2016/0164915 | A1 | 6/2016 | Cook | |
| 2017/0091303 | A1* | 3/2017 | Rashid | G06N 20/00 |
| 2017/0193624 | A1 | 7/2017 | Tsai | |
| 2017/0255792 | A1 | 9/2017 | Kim et al. | |
| 2017/0279831 | A1* | 9/2017 | Di Pietro | H04L 43/0894 |
| 2017/0357827 | A1 | 12/2017 | Shoa | |
| 2017/0359313 | A1* | 12/2017 | Livneh | H04L 63/0414 |
| 2018/0083843 | A1 | 3/2018 | Sambandam | |
| 2019/0335327 | A1* | 10/2019 | Al-Kabra | G06F 16/9566 |

OTHER PUBLICATIONS

Szymielewicz et al., The GDPR and Browser Fingerprinting: How It Changes the Game for the Sneakiest Web Trackers, EFF: Electronic Frontier Foundation, Jun. 19, 2108.
Multilogin, The Only Two Approaches to Combat Browser Fingerprinting, Multilogin.com, Blog, May 9, 2017.
Stockley, Browser fingerprints—the invisible cookies you can't delete, Naked Security, Sophos.com, Dec. 1, 2014.
Nikiforakis, Nick; et al., PriVaricator: Deceiving Fingerprinters with Little White Lies, MSR-TR-2014-26, Feb. 28, 2014.
Faizkhademi, Amin; et al., FPGuard: Detection and Prevention of Browser Fingerprinting, School of Computing, Queen's University, Kingston, Canada, Jul. 2015.
International Search Report, dated Sep. 16, 2020, from corresponding International Application No. PCT/US2020/035024.
Written Opinion of the International Searching Authority, dated Sep. 16, 2020, from corresponding International Application No. PCT/US2020/035024.
International Search Report, dated Sep. 10, 2020, from corresponding International Application No. PCT/US2020/035777.
Written Opinion of the International Searching Authority, dated Sep. 10, 2020, from corresponding International Application No. PCT/US2020/035777.
International Search Report, dated Sep. 14, 2020, from corresponding International Application No. PCT/US2020/035393.
Written Opinion of the International Searching Authority, dated Sep. 14, 2020, from corresponding International Application No. PCT/US2020/035393.

\* cited by examiner

SYSTEMS, METHODS, AND DEVICES FOR PRIVACY-PROTECTING DATA LOGGING

RELATED APPLICATIONS

This application claims the benefit of U.S. Provisional Patent Application Ser. No. 62/856,491, filed Jun. 3, 2019 and U.S. Provisional Patent Application Ser. No. 62/874,240, filed Jul. 15, 2019. It is related to U.S. patent application Ser. No. 16/598,734, filed Oct. 10, 2019. The disclosures of each of these applications is hereby incorporated, by reference, in its entirety.

BACKGROUND OF THE INVENTION

1. Field of the Invention

Embodiments are generally directed to managing privacy and digital identity data, and, in particular, systems, methods, and devices for privacy-protecting data logging.

2. Description of the Related Art

Every person has a right to privacy and a digital identity that they own and control but we lack a trusted, simple way to preserve privacy. Everything we say, do and experience on our phones and online is tracked and controlled by other parties, and consumers are often unaware what data are being collected and shared about them.

In a sandboxed environment like Apple's iOS, it is not possible for a local application to see a user's web browsing history. This means the application cannot provide any analysis of the user's activity even if that analysis is targeted at improving the user's privacy and education. Solutions to this problem often use a web proxy in the network to authenticate or match the user to the device's IP address. Then the web proxy logs URLs with a user identifier that the local app can retrieve on demand. This approach, however, creates additional privacy problems for the user as there is a central service that has a record of the user's entire browsing history.

SUMMARY OF THE INVENTION

Systems, methods, and devices for privacy-protecting data logging that can log user behavior (e.g., web browsing) without creating a user-specific list of browsed URLs are disclosed. In one embodiment, in an information processing apparatus comprising at least a token server, a privacy service, and a data store, a method for privacy logging may include: (1) providing, by the token server, a token to a privacy application executed on an electronic device and to a privacy service; (2) receiving, by the privacy service, browsing traffic from a browser or application executed by the electronic device; (3) associating, by the privacy service, the browsing traffic with the token; and (4) storing, by the data store, the associated browsing traffic with the token.

In one embodiment, the token server may select the token from a pool of reusable tokens.

In one embodiment, the method may further include receiving, by the token server, a device identifier and IP address for the electronic device.

In one embodiment, wherein the token may be associated with a token reassignment period.

In one embodiment, the associated browsing traffic may be encrypted in the data store.

In one embodiment, the browsing traffic may include a URL.

In one embodiment, the method may further include receiving, at the data store and from the privacy application, a request for associated browsing traffic associated with the token; and returning, by the data store, the associated browsing traffic to the privacy application.

In one embodiment, the method may further include providing, by the token server, a second token to the privacy application after the token reassignment period.

According to another embodiment, a system for privacy-protecting data logging may include a user electronic device comprising at least one computer processor executing a privacy application and a browsing application, a data store, a token server, and a privacy service executed by a network-based electronic device. The token server may provide a token to the privacy application and the privacy service. The privacy service may receive browsing traffic from the browsing application and may associate the browsing traffic with the token. The data store may store the associated browsing traffic with the token.

In one embodiment, wherein the token server may store a pool of reusable tokens and may select the token from the pool of reusable tokens.

In one embodiment, wherein the token server may receive a device identifier and IP address for the user electronic device.

In one embodiment, wherein the token may be associated with a token reassignment period.

In one embodiment, the associated browsing traffic may be encrypted in the data store.

In one embodiment, the browsing traffic may include a URL.

In one embodiment, the data store may receive a request for associated browsing traffic associated with the token from the privacy application and returns the associated browsing traffic to the privacy application.

In one embodiment, the token server may provide a second token to the privacy application after the token reassignment period.

In one embodiment, the privacy service may include a privacy appliance.

In one embodiment, wherein the browsing application may include a browser or an application.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Embodiments are directed to systems, methods, and devices for privacy-protecting data logging.

Embodiments are directed to features that may be associated with, used by, or used in conjunction with an in-line architecture. For example, the architecture may include a network proxy that may be provided, for example, between an electronic device that may provide identifying information (e.g., a smartphone, computer, Internet of Things (IoT) appliance, smart watch, etc.) and the Internet services (e.g., a website, an app backend, etc.) the device is accessing. The network proxy may be provided, for example, in a service provider, such as an Internet Service Provider (ISP), a mobile data provider (e.g., a cellular data provider), etc.

In another embodiment, some or all functionality may be provided in a network gateway. In another embodiment, some or all features may be implemented in a personal hotspot, a local micro-cell, in a consumer or local network device that may be connected into a network designed to insert itself into the communication flow (aka ARP or IP spoofing or "Man in the Middle"), etc. In another embodiment, some or all functionality may be provided on a computer program or "app" on the electronic device. And, in embodiments, combinations of any of the above may be used as is necessary and/or desired.

Embodiments may provide a local application executed on an electronic device with a list of URLs without allowing the web proxy owner the ability to see the list. This keeps the user's private data on storage that the user owns, such as the user's electronic device.

Figure 1:
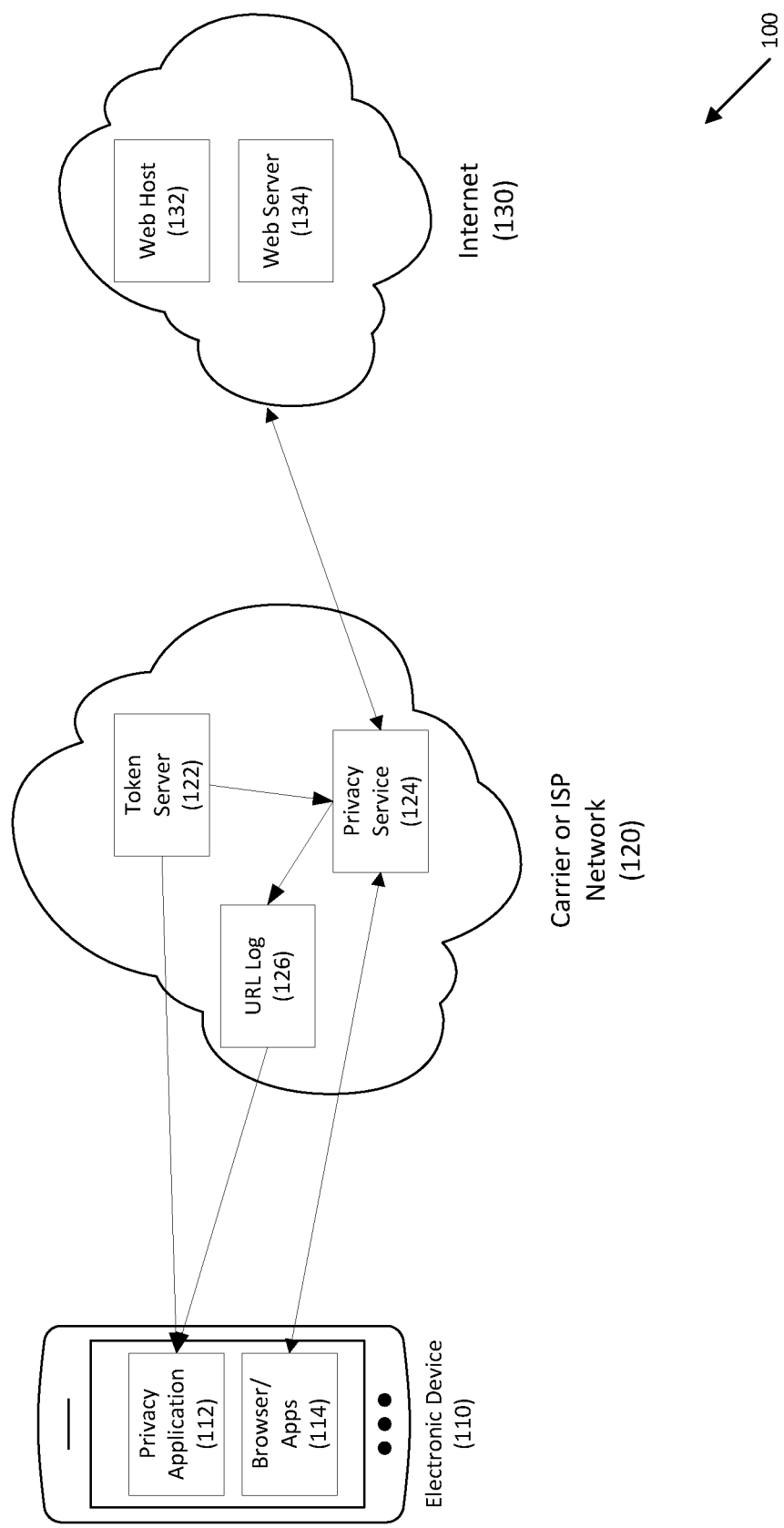
FIG. 1 discloses system for privacy-protecting data logging according to one embodiment.

Referring to FIG. 1, a system for privacy-protecting data logging is disclosed according to one embodiment. System 100 may include consumer electronic device 110, such as smart phones, computers (e.g., desktop, laptop, notebook, etc.), IoT devices (e.g., smart watches, smart rings, home automation devices, home voice-controlled devices, etc.), smart vehicles, smart fitness devices, etc. Any device that may share information with a third party may be included as is necessary and/or desired.

Electronic device 110 may execute privacy application 112 and browser and applications 114. Although only one browser or application is identified in FIG. 1, it should be recognized that multiple browsers and/or applications may be executed by electronic device 110.

System 100 may further include carrier or ISP network 120, which may include token server 122, privacy service 124, and URL log 126. Token server 122 may maintain a pool of reusable tokens or other suitable identifiers that may be periodically rotated, randomly rotated, etc. Token server 122 may generate new tokens if the pool is exhausted, or as otherwise necessary and/or desired.

Token server 122 may provide the tokens to privacy application 112 and privacy service 124.

Privacy service 124 may be a web proxy or other proxy device/service that receives web traffic from browser/applications 114 and may perform privacy services on the web traffic, such as device fingerprint obfuscation. Privacy service 124 may be implemented in hardware and/or software. For example, privacy service 124 may be implemented as an appliance.

Privacy service 124 may pass the web traffic to a destination on Internet 130, such as web host 132, web server 134, etc. Privacy service 124 may associate URLs browsed by browser 114 with a token provided by token server 122 and store the tokens and associated URLs in URL log 126.

URL log 126 may log URLs and any other data as is necessary and/or desired.

Figure 2:
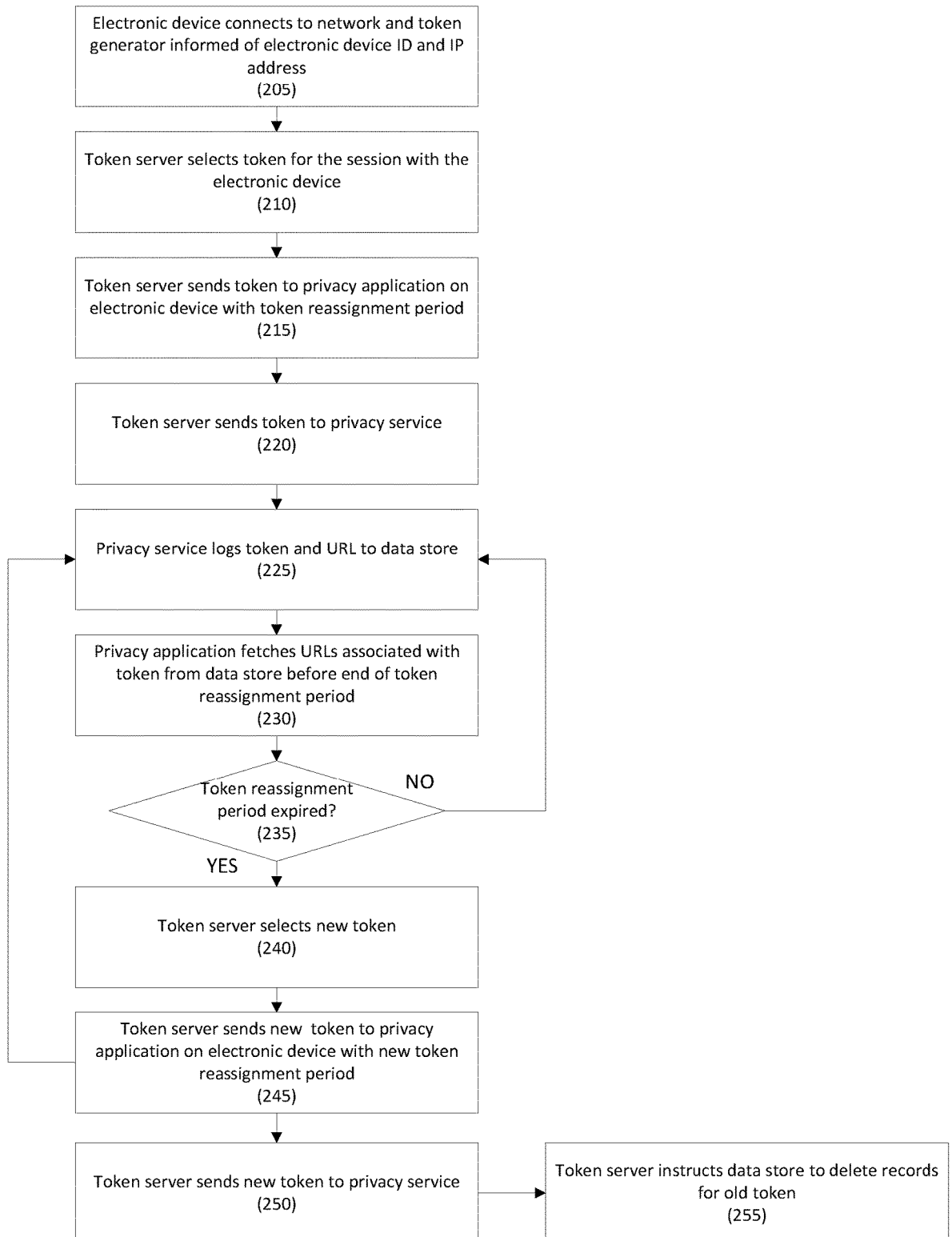
FIG. 2 discloses a method for privacy-protecting data logging according to one embodiment.

Referring to FIG. 2, a method for privacy-protecting data logging is disclosed according to one embodiment.

In step 205, an electronic device may connect to a network, such as a VPN, a carrier network, etc. A token generator may be informed of the electronic device ID and the electronic device's IP address.

In one embodiment, a privacy application executed on the electronic device may inform the token generator of the device ID and IP address by requesting a token.

In another embodiment, a service (e.g., RADIUS, DHCP, VPN, etc.) may notify the token server that the electronic device has connected to the network.

In another embodiment, the privacy application may generate a token and may provide the token to the token server.

In embodiments, encryption may be used. For example, the privacy application may generate a public/private key pair, and may provide its public key to a privacy service. Other manners of encryption may be used as is necessary and/or desired.

In step 210, if the token was not provided by the privacy application, the token server may select a token for use with the electronic device. In one embodiment, the token generator may retrieve an unused token from its pool of tokens. If there are no unused tokens, a new token may be generated.

In one embodiment, the token may be selected from the token pool randomly. In another embodiment, the tokens in the token pool may selected based on a rotation.

The use and reuse of tokens from the token pool means that any association between a URL and a token is not associated with any one electronic device as, over the course of time, multiple electronic devices will use the same token.

In step 215, the token server may send the token to the privacy application executed by the electronic device. The token server may further send an identification of a token reassignment period, i.e., the time at which the token will no longer be used to track browsing from the electronic device. In one embodiment, the notification may be a push notification. In another embodiment, the privacy application may request the token and the token reassignment period from the token server.

In another embodiment, the token reassignment period may be static (e.g., 10 minutes, a certain number of URLs, etc.). In another embodiment, the token reassignment period may be dynamic (e.g., based on a random passage of time, a random number of URLs, etc.).

In one embodiment, if the token reassignment period is static, the token reassignment period may not need to be communicated to the privacy application.

In step 220, the token server may send the token to a privacy service so that the privacy service can use the token for logging URLs fetched by the electronic device (e.g., browsers, applications, etc.).

In another embodiment, the privacy service may request the token when it sees a new electronic device based on the electronic device IP address or any other information, such as a new user logon.

In step 225, the privacy service may associate the URLs fetched by the electronic device with the token, and may send those to the data store. Any other data about the session may be associated, but in one embodiment, anything that identifies the electronic device may not be stored. In one embodiment, the URLs and the additional data may be encrypted. The token remains unencrypted.

In another embodiment, the URL and additional data may be provided to a third party for storage.

In step 230, at any point before the end of the token reassignment period, the privacy application may request the URLs and additional data associated with the token from the data store. The data store may then provide the URLs, which may be encrypted, to the privacy application, and the privacy application may decrypt the URLs and additional data.

After the URLs and additional data are retrieved, the data store may delete the URLs and additional data.

In step 235, the process of collecting URLs, associating the URLs with the token, and logging the URLs associated with the token may be repeated before the expiration of the token reassignment period.

After the token reassignment period is expired, in step 240, the token server may select a new token for the electronic device. The token server may also set a new token reassignment period, or it may use the same token reassignment period. This may be similar to step 210, above.

In one embodiment, the privacy application may request a new token from the token server, or may provide a new token to the token server.

In step 245, the token sever may send the new token to the privacy application. It may also send a new token reassignment period to the privacy application, if necessary. The old token may be returned to the token pool, may be deleted, etc. In one embodiment, the old token may not be used for a certain period (e.g., one token expiration period) to prevent accidental collisions.

In one embodiment, the privacy application may provide a new public key.

In step 250, the token server may send the new token to the privacy service. This may be similar to step 220, above. The privacy service may then start associating URLs and any additional data with the new token.

In step 255, the token server or the privacy service may send a command to the data store to delete all records associated with the old token, and the token server may delete the records.

Although multiple embodiments have been disclosed, it should be recognized that these embodiments are not mutually exclusive and features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for privacy-protecting data logging, comprising:
providing, by a token server, a token to a privacy application executed on an electronic device and to a privacy service, wherein the token server and the privacy service are part of a data carrier network or an Internet Service Provider (ISP) network;

receiving, by the privacy service and via the data carrier network or the ISP network, browsing traffic comprising a plurality of Uniform Resource Locators (URLs) from a browser or application executed by the electronic device;
    anonymizing, by the privacy service, the browsing traffic to remove any identification of the electronic device in the browsing traffic;
associating, by the privacy service, the anonymized browsing traffic with the token;
storing, by the privacy service, the anonymized browsing traffic and the token in a data store;
receiving, by the privacy service and from the privacy application, the token and a request for the stored, anonymized browsing traffic associated with the token;
retrieving, by the privacy service and in response to receiving the token and the request from the privacy application, the stored, anonymized browsing traffic associated with the token from the data store; and
returning, by the privacy service, the stored, anonymized browsing traffic to the privacy application.

2. The method of claim 1, wherein the token server selects the token from a pool of reusable tokens.

3. The method of claim 1, further comprising:
receiving, by the token server, a device identifier and IP address for the electronic device.

4. The method of claim 1, wherein the token is associated with a token reassignment period.

5. The method of claim 1, wherein the stored, anonymized browsing traffic is encrypted in the data store.

6. The method of claim 4, further comprising:
providing, by the token server, a second token to the privacy application after the token reassignment period.

7. A system for privacy-protecting data logging, comprising:
a user electronic device comprising at least one computer processor executing a privacy application and a browsing application; and
a data carrier network or an Internet Service Provider (ISP) network comprising:
    a data store;
    a token server; and
    a privacy service executed by a network-based electronic device;
wherein:
    the token server provides a token to the privacy application and the privacy service;
    the privacy service receives, via the data carrier network or the ISP network, browsing traffic comprising a plurality of Uniform Resource Locators (URLs) from the browsing application;
        the privacy service anonymizes the browsing traffic to remove any identification of the user electronic device in the browsing traffic;
    the privacy service associates the anonymized browsing traffic with the token;
    the privacy service stores the anonymized browsing traffic and the token in the data store;
    the privacy service receives, from the privacy application, the token and a request for the stored, anonymized browsing traffic associated with the token;
    in response to receiving the token and the request from the privacy application, the privacy service retrieves the stored, anonymized browsing traffic associated with the token from the data store; and
    the privacy service returns the stored, anonymized browsing traffic to the privacy application.

8. The system of claim 7, wherein the token server selects the token from a pool of reusable tokens.

9. The system of claim 7, wherein the token server receives a device identifier and IP address for the user electronic device.

10. The system of claim 7, wherein the token is associated with a token reassignment period.

11. The system of claim 9, wherein the stored, anonymized browsing traffic is encrypted in the data store.

12. The system of claim 10, wherein the token server provides a second token to the privacy application after the token reassignment period.

13. The system of claim 7, wherein the privacy service comprises a privacy appliance.

14. The system of claim 7, wherein the browsing application comprises a browser or an application.

\* \* \* \* \*